(12) United States Patent
Bar-Cohen et al.

(10) Patent No.: US 7,824,247 B1
(45) Date of Patent: Nov. 2, 2010

(54) PORTABLE RAPID AND QUIET DRILL

(75) Inventors: Yoseph Bar-Cohen, Seal Beach, CA (US); Mireca Badescu, Arcadia, CA (US); Xiaoqi Bao, San Gabriel, CA (US); Zenshea Chang, Irvine, CA (US); Stewart Sherrit, La Crescenta, CA (US)

(73) Assignee: The United States of America as represented by the Administrator of the National Aeronautics and Space Administration, Washington, DC (US)

( * ) Notice: Subject to any disclaimer, the term of this patent is extended or adjusted under 35 U.S.C. 154(b) by 154 days.

(21) Appl. No.: 11/756,819

(22) Filed: Jun. 1, 2007

(51) Int. Cl.
  *H02N 2/00* (2006.01)
  *E21B 3/00* (2006.01)
  *B24B 23/03* (2006.01)

(52) U.S. Cl. .................. 451/165; 125/28; 408/700; 451/358; 451/910

(58) Field of Classification Search .............. 451/1, 451/28, 124, 165, 358, 344, 910; 604/2, 604/22, 169; 433/188, 119; 172/35, 776; 408/700, 124; 125/28, 36; 175/424
See application file for complete search history.

(56) References Cited

U.S. PATENT DOCUMENTS

| 2,792,674 | A |   | 5/1957  | Balamuth et al. |
| 2,818,686 | A |   | 1/1958  | Weiss |
| 2,831,295 | A |   | 4/1958  | Weiss |
| 2,834,158 | A |   | 5/1958  | Petermann |
| 2,947,886 | A |   | 8/1960  | McGunigie |
| 3,091,060 | A |   | 5/1963  | Giegerich et al. |
| 3,561,462 | A |   | 2/1971  | Jugler |
| 3,614,484 | A |   | 10/1971 | Shoh |
| 3,619,671 | A | * | 11/1971 | Shoh ..................... 310/325 |
| 4,373,412 | A |   | 2/1983  | Gerber et al. |
| 4,530,138 | A | * | 7/1985  | Ritter .................. 29/25.35 |
| 4,596,171 | A |   | 6/1986  | Gerber |
| 4,667,755 | A |   | 5/1987  | Muller et al. |
| 4,828,052 | A |   | 5/1989  | Duran et al. |
| 4,838,853 | A | * | 6/1989  | Parisi .................... 604/22 |
| 4,934,103 | A |   | 6/1990  | Campergue et al. |
| 5,167,619 | A |   | 12/1992 | Wuchinich |
| 5,361,543 | A |   | 11/1994 | Bory |
| 5,620,274 | A | * | 4/1997  | Wear .................... 403/171 |
| 5,733,074 | A | * | 3/1998  | Stock et al. ............ 408/17 |
| 6,204,592 | B1 |   | 3/2001 | Hur |
| 6,498,421 | B1 | * | 12/2002 | Oh et al. ............ 310/323.18 |
| 6,689,087 | B2 | * | 2/2004  | Pal et al. ................ 604/22 |
| 6,863,136 | B2 |   | 3/2005 | Bar-Cohen et al. |
| 7,079,450 | B2 | * | 7/2006  | Breed et al. ........... 367/138 |
| 7,157,833 | B2 | * | 1/2007  | Hess .................. 310/323.18 |

* cited by examiner

*Primary Examiner*—Timothy V Eley
(74) *Attorney, Agent, or Firm*—Mark Homer

(57) ABSTRACT

A hand-held drilling device, and method for drilling using the device, has a housing, a transducer within the housing, with the transducer effectively operating at ultrasonic frequencies, a rotating motor component within the housing and rigid cutting end-effector rotationally connected to the rotating motor component and vibrationally connected to the transducer. The hand-held drilling device of the present invention operates at a noise level of from about 50 decibels or less.

9 Claims, 1 Drawing Sheet

PORTABLE RAPID AND QUIET DRILL

STATEMENT AS TO FEDERALLY-SPONSORED RESEARCH

The invention described herein was made in the performance of work under a NASA contract, and is subject to the provisions of Public Law 96-517 (U.S.C. 202) in which the Contractor has elected not to retain title.

BACKGROUND OF THE INVENTION

1. Field of the Invention

The present invention relates to a hand-held drilling device, and method of drilling, for quiet drilling operations.

2. Description of the Related Art

Drilling includes rotation of long pointed pieces of metal, held in a machine, rotated at high speed to produce boreholes in hard substances such as masonry, concrete or rock. In many instances, noise resulting from drilling operations becomes problematic because of the drilling location or time of operations. Drilling operations done during the night present a particularly bothersome noise to the local community. Additionally, the use of hearing protection in the high noise areas of drilling operations may be difficult, if not impossible, to use, such as within a restricted space, in high hazard areas, and the like.

Accordingly, there is a need in the art to provide a portable and quiet drilling device. The present invention addresses this and other needs.

SUMMARY OF THE INVENTION

The present invention includes a hand-held drilling device comprising a housing, a transducer component within the housing and rigid cutting end-effector rotationally connected to the rotating motor component and vibrationally connected to the transducer.

The present invention also includes a method for drilling comprising the steps of providing a hand-held drilling device having a housing, a transducer within the housing, with the transducer operating at ultrasonic frequencies, a rotating motor component within the housing, rigid cutting end-effector rotationally connected to the rotating motor component and vibrationally connected to the transducer and initiating the transducer and rotating motor component effective for ultrasonic drilling.

Additionally, the present invention includes a silent drilling product produced by operation of the hand-held drill of the present invention.

DETAILED DESCRIPTION OF THE PREFERRED EMBODIMENT

Figure 1:
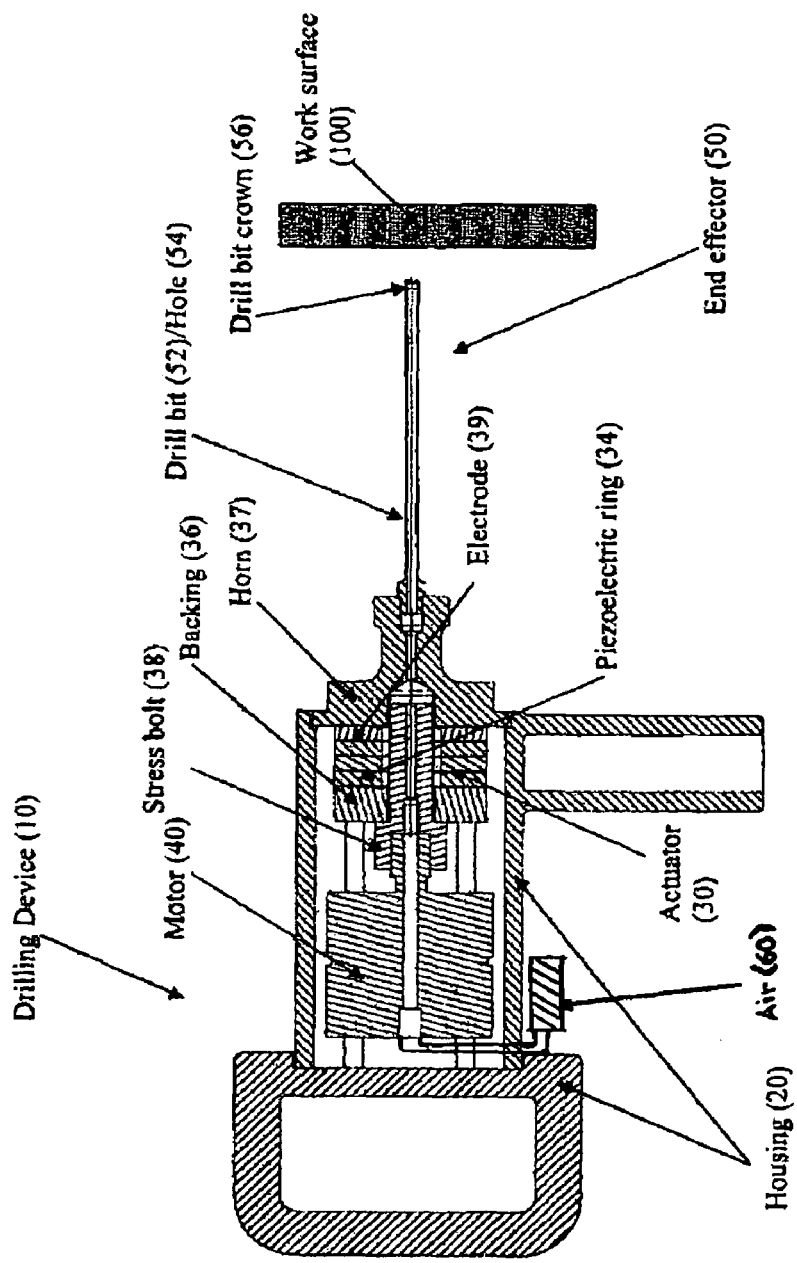
FIG. 1 illustrates component parts of the quiet, portable drilling device of the present invention.

The present invention provides a portable, quiet drill for industrial applications, such as concrete drilling.

As seen in FIG. 1, the present invention includes a hand-held drilling device 10 for quiet operations. The drilling device 10 includes a housing 20 that contains the working mechanisms of the device 10, with the housing 20 preferably including a composite or plastic composition, or other like materials, that resist the transmission or production of noise therethrough or therein. However, the composition of the housing 20 retains a sufficiently resilient structure for withstanding compressional forces generally incurred with drilling operations of a hard surface or work surface 100, as detailed herein.

Within the housing 20, the drilling device 10 further includes a transducer or actuator 30. The transducer 30 operates at ultrasonic frequencies during drilling. The transducer 30 includes an ultrasonic transducer capable of quiet operations, preferably operating at frequencies from about 10-kHz to about 50-kHz, more preferably from about 20-kHz to about 30-kHz, and most preferably at about 25-kHz. The actuator 30 is preferably made of a piezoelectric transducer, generally having a piezoelectric stack, backing layer 36, stress bolt 38 and horn 37 allowing for the formation of a central borehole 54 therethrough for dust removal. The horn 37 may be solid or allow for a hole therethrough. Representative sizes of the horn 37 may include from about 1 to about 2 inches in length, with weights of from about 0.1 lb to about 2 lbs. The transducer 30 preferably includes a piezoelectric transducing stack as a means for mechanical longitudinal stroke from the housing 20 which amplifies and transmits the amplified mechanical axial stroke to a rigid cutting end-effector 50, detailed below. The backing layer 36 and stress bolt 38 provide structural integrity to the piezoelectric stack within the housing 20.

The actuator 30 preferably includes multiple piezoelectric rings 34 and electrodes 39, with ceramic piezoelectric transducers preferred, although other piezoelectric devices may be used. The multiple piezoelectrics and electrodes preferably include 2 or more piezoelectrics and electrodes, more preferably from about 2 to 5 piezoelectrics and about 2 to 5 electrodes, with various other configurations determinable by those skilled in the art in building low power, small and lightweight drills for particular drilling devices 10. The size and number of piezoelectrics useful in the present invention is determined by the control voltage that can be applied to the device and the desired range of the ultrasonic operating frequency. The rigid cutting end-effector 50 is rigidly connected to the transducer 30 allowing transmission of the ultrasonic stress wave to pass to from the transducer 30 onto the rigid cutting end-effector 50 through the coupling therebetween.

A rotating motor component 40 within the housing 20 provides rotational movement of the rigid cutting end-effector 50. The rotating motor component 40 includes a rotating mechanism, such as a disk, arm or other like mechanisms that is mechanically attached to, and imparting the rotation to, the rigid cutting end-effector 50. The rotating motor component 40 is effectively secured to the housing 20, fixed at a particular location therein, to remain stable during operations and impart a consistent and powerful force onto the attached rigid cutting end-effector 50. As the rotating motor component 40 rotates within the housing 20, imparting the rotational movement onto the rigid cutting end-effector 50 (once the drilling device 10 is activated), the piezoelectric transducer 30 imparts axial movement to the rigid cutting end-effector 50, providing the rigid cutting end-effector 50 with concurrent rotational and axial movement. Rotational movement may include uni-directional or bi-directional rotation, i.e., either or both clockwise and counter-clockwise directions, as needed. Uni-directional rotation of the rotating motor component 40 provides a set means for accomplishing a drilling methodology onto the hard surface 100, and use of the counter bi-directional direction further aides in the drilling of the hard surface 100 in with an additional counter drilling methodology that further enhance the effect of the drill on the hard surface 100. The rotating motor component 40 preferably provides high torque at lower rpm (revolutions per minute). Representative rotating speeds of the rotating motor component 40 include, for example, speeds of from about 1 rpm to about 3600 rpm, preferably, from about 20 rpm to about 400 rpm, more preferably from about 40 rpm to about 80 rpm, and most preferably from about 55 rpm to about 65 rpm.

The rigid cutting end-effector 50, being rotationally connected to the rotating motor component 40 and vibrationally connected to the transducer 30, imparts both rotational and axial force onto the work piece 100 while drilling. As further seen in FIG. 1, the rigid cutting end-effector 50 of the present invention preferably includes a removable and replaceable drill bit 52, that may have one or a variety of configurations, such as tracked or indented patterned chiseling surfaces, a screwdriver tip, flat, Phillips, etc., rough edging, etc., and compositions that may include stainless steel, tool steel, titanium, diamond, or other similar hardened materials suitable for drilling the hard surfaces 100, particularly concrete. Preferably, the rigid cutting end-effector 50 includes an extension of the drill bit 52 in the form of a crown 56, or other like shape, allowing use of harder materials, such as carbide, than the rest of the drill bit 52. Multi-component drill bits 52 allow for lower cost per unit with an increase in the functionality of the drill bits 52, such as increasing the case in machining. The drill bit 52 is preferably screwed onto the horn 37 of the actuation 30 to allow replacement of the drill bit 52 when necessary, such as when different bit configuration are required, or when breakage or fracture have occurred. Preferably, the rigid cutting end-effector 50 imparts a total force to the level of the compressive strength of the work piece 100 under the bit work piece area. Representative stresses imparted by the rigid cutting end-effector 50 include from about 5 MPa or greater, such as from about 5 MPa to about 100 MPa onto a work piece 100.

Preferably, the drill bit 52 includes a front cutting end-effector crown 56 with teeth to allow rapid drilling, having a large diameter at the mounting area to the horn 37. Concurrently, the hand-held drilling device 10 may preferably include the rigid cutting end-effector 50 with the drill bit 52 forming the central borehole 54. As such, the drilling device 10 may advantageously further include a compressor 60 or other similar means, communicatively connected to the formed central borehole 54 that is effective in flushing or removing dust, powder or bits of shattered work piece surface 100 during the quiet drilling operations. The drilling device 10 may further comprise an air supply communicatively connected to the formed central borehole 54 within the rigid cutting end-effector 50 that effectively imparts positive air pressure, or other flushing media, through the central borehole 54. Representative flushing and/or removing media may include air, water, solvents, etc., with the preferred methodology of the compressor 60 imparting positive air pressure through the central borehole 54. The positive air supply through the central borehole 54 in the drill bit 52 may be angled, tunneled, sprayed, or otherwise configured to best clear accumulating dust and debris. Representative work surfaces 100 that may be worked by the rigid cutting end-effector 50 of the drilling device 10 include, for example without limitation, stone, brick, concrete, hardened composites, and the like, for effecting drilling of the same. The rigid cutting end-effector 50 provides a drilling actuator for cutting, removing, severing, or otherwise parting these and other hard surfaces 100.

The present invention provides a silent drilling product during operation of the hand-held drill 10. Ultrasonic frequencies of about 25 kHz are beyond human hearing. Quiet operations of the present invention include noise levels that permit the operator of the drilling device 10 to operate the drilling device without hearing protection and remain within safe audio operations from threat of hearing loss. This safe zone of operations may vary with different work pieces. Preferably, the quiet drill provides an audio level of less than about 50 decibels, more preferably less than about 45 decibels, and most preferably less than about 40 decibels. In operation, the transducer 30 and rotating motor component 40 of the above-identified drilling device 10 impart axial and rotational motion, respectively, to the rigid cutting end-effector 50 to initiate ultrasonic drilling. At transducer 30 operating frequencies of about 25-kHz, the axial motion of the rigid cutting end-effector 50 is quietly performed. The rigid cutting end-effector 50, imparting total forces greater than the compressive strength of the work piece allows effective and efficient drilling operations of the hard surface 100, e.g., concrete, or other like hard materials. As such the drilling device 10 effectively drills through concrete 100 at a rate of from about 2 cm/min or more while remaining quiet during such drilling operations. This operational performance makes the drilling device of the present invention is particularly applicable for NASA's missions of planetary exploration, covert military operations and late night maintenance operations in urban areas.

EXAMPLE 1

A drilling device is constructed having a total weight of less than 5 lbs. The drilling device has a transducer with 4 piezoelectric elements and 4 electrodes, with each piezoelectric element having a weight of about 2 ounces and a diameter of about 1.5 inches, and each electrode having a weight of less than 1 ounce and a diameter of about 1 inch. The drill bit is made of reinforced steel, with a carbide crown. The actuator includes an input of up to 200 watts. The transducer operates at a frequency of about 25 kHz and a rotation speed of about 100 rpm. The drilling device imparts axial stresses onto the work piece of about 65 MPa. The noise level of the drill device, in operation, is about 45 decibels.

EXAMPLE 2

A drilling device is constructed having a total weight of 7.5 lbs. The drilling device has a transducer with 6 piezoelectric elements and 5 electrodes, with each piezoelectric element having a weight of about 4 ounces and a diameter of about 2 inches, and each electrode having a weight of less than 1 ounce and a diameter of about 2 inches. The drill bit is made of reinforced steel. The actuator includes an output of up to 300 watts. The transducer operates at a frequency of about 20 kHz and a rotational speed of about 85 rpm. The drilling device imparts stresses onto the work piece of about 75 MPa. The noise level of the drill device, in operation, is about 50 decibels.

EXAMPLE 3

A drilling device is constructed having a total weight of up to 4.5 lbs. The drilling device has a transducer with 3 piezoelectric elements and 3 electrodes, with each piezoelectric element having a weight of about 3 ounces and a diameter of about 1.5 inches, and each electrode having a weight of less than 1 ounce and a diameter of about 1 inch. The drill bit is made of carbide, with a diamond-bit crown. The actuator includes an output of up to 150 watts. The transducer operates at a frequency of about 30 kHz and a speed of about 50 rpm.

The drilling device imparts stresses onto the work piece of about 50 MPa. The noise level of the drill device, in operation, is about 40 decibels.

EXAMPLE 4

A drilling device is constructed having a total weight of up to 9 lbs. The drilling device has a transducer with 8 piezoelectric elements and 7 electrodes, with each piezoelectric element having a weight of about 4 ounces and a diameter of about 1.5 inches, and each electrode having a weight of less than 1 ounce and a diameter of about 1 inch. The drill bit is made of reinforced steel, with a carbide crown. The actuator includes an output of up to 300 watts. The transducer operates at a frequency of about 12 kHz and a motor speed of about 500 rpm. The drilling device imparts stresses onto the work piece of about 100 MPa. The noise level of the drill device, in operation, is about 50 decibels.

EXAMPLE 5

A drilling device is constructed having a total weight of up to 3.0 lbs. The drilling device has a transducer with 2 piezoelectric elements and 2 electrodes, with each piezoelectric element having a weight of about 1 ounce and a diameter of about 1 inch, and each electrode having a weight of less than 1 ounces and a diameter of about 1 inch. The drill bit is made of reinforced steel having a diamond-bit crown. The actuator includes an output of 50 watts. The transducer operates at a frequency of about 35 Hz and a speed of about 45 rpm. The drilling device imparts stresses onto the work piece of about 30 MPa. The noise level of the drill device, in operation, is about 30 decibels.

The foregoing summary, description, examples and drawings of the invention are not intended to be limiting, but are only exemplary of the inventive features which are defined in the claims.

What is claimed is:

1. A hand-held drilling device, comprising:
   a housing constructed of materials that resist transmission or production of noise therethrough;
   a transducer within the housing which operates at ultrasonic frequencies from about 20 kHz to about 30 kHz;
   a rotating motor within the housing; and,
   a rigid cutting end-effector rotationally connected to the rotating motor and vibrationally connected to the transducer, wherein the hand-held drilling device operates at a noise level comprising about 50 decibels or less.

2. The device of claim 1, wherein the transducer comprises multiple piezoelectric elements and electrodes.

3. The device of claim 2, comprising 2 or more piezoelectric elements and about 2 or more electrodes.

4. The device of claim 1, wherein the ultrasonic transducer is capable of operating at about 25-kHz.

5. The device of claim 1, wherein the rotating motor rotates at a speed of from about 1 rpm to about 400 rpm.

6. The device of claim 1, wherein the rigid cutting end-effector includes a drill bit.

7. The device of claim 6, wherein the drill bit forms a thin auger on an outer surface for the removal of accumulating dust through rotation of the bit.

8. The device of claim 6, wherein the drill bit forms a central borehole.

9. The device of claim 8, further comprising a gas supply communicatively connected to the formed central borehole effective for imparting positive gas pressure through the central borehole.

\* \* \* \* \*

UNITED STATES PATENT AND TRADEMARK OFFICE
CERTIFICATE OF CORRECTION

| | | |
|---|---|---|
| PATENT NO. | : 7,824,247 B1 | Page 1 of 1 |
| APPLICATION NO. | : 11/756819 | |
| DATED | : November 2, 2010 | |
| INVENTOR(S) | : Yoseph Bar-Cohen et al. | |

It is certified that error appears in the above-identified patent and that said Letters Patent is hereby corrected as shown below:

ON THE TITLE PAGE:

Item (75) Inventors: names are spelled incorrectly; the corrected names should read:
Mircea Badescu and Zensheu Chang Signed and Sealed this
Fourth Day of September, 2012

David J. Kappos
*Director of the United States Patent and Trademark Office*